(No Model.) 2 Sheets—Sheet 1.

M. SCHOLZ, D. J. O'CONNOR & R. J. BREMNER.
WEIGHING MACHINE.

No. 557,237. Patented Mar. 31, 1896.

WITNESSES:
G. H. Longard
H. E. Schnabel

INVENTORS
Max Scholz
Daniel J. O'Connor
Robert J. Bremner
by Casper L. Redfield
ATTORNEY.

(No Model.) 2 Sheets—Sheet 2.

M. SCHOLZ, D. J. O'CONNOR & R. J. BREMNER.
WEIGHING MACHINE.

No. 557,237. Patented Mar. 31, 1896.

WITNESSES:
G. H. Longard
H. Schnabel

INVENTORS,
Max Scholz
Daniel J. O'Connor
Robert J. Bremner
by Casper L. Redfield
ATTORNEY.

UNITED STATES PATENT OFFICE.

MAX SCHOLZ, DANIEL J. O'CONNOR, AND ROBERT J. BREMNER, OF CHICAGO, ILLINOIS.

WEIGHING-MACHINE.

SPECIFICATION forming part of Letters Patent No. 557,237, dated March 31, 1896.

Application filed March 2, 1895. Serial No. 540,379. (No model.)

*To all whom it may concern:*

Be it known that we, MAX SCHOLZ, DANIEL J. O'CONNOR, and ROBERT J. BREMNER, citizens of the United States, residing at Chicago, in the county of Cook and State of Illinois, have invented certain new and useful Improvements in Weighing-Machines, of which the following is a specification.

Our invention relates to machines for continuous weighing, and has for its object the arrangement of certain devices for making such weighing accurate and automatic.

Figure 1:
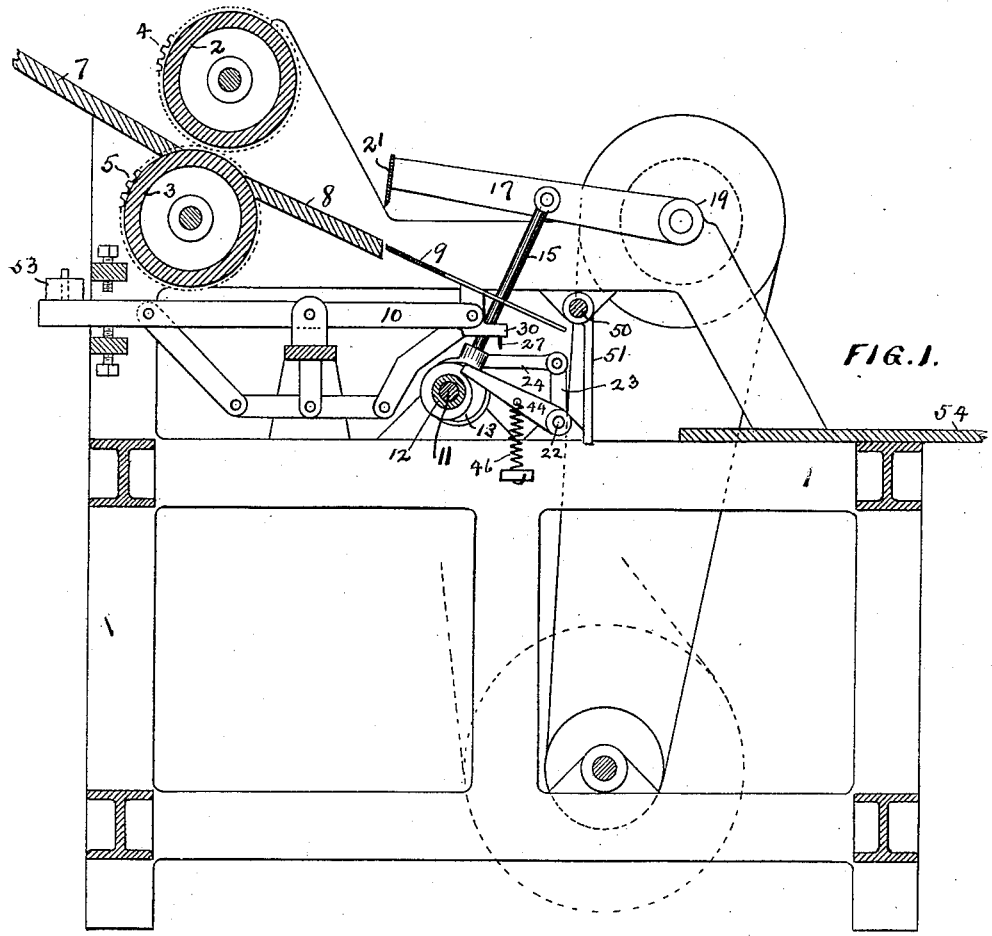
Figures 3, 4, 5:
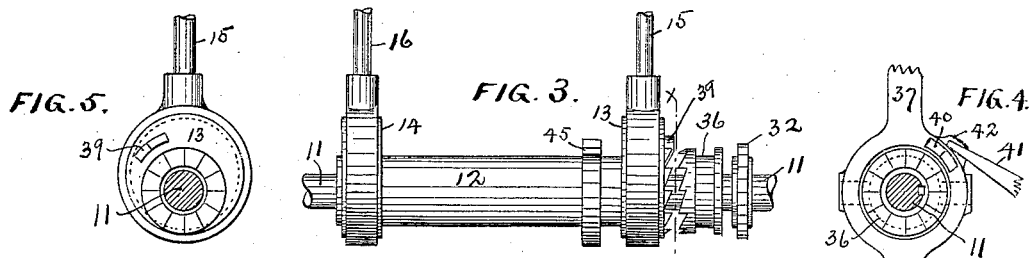
Figure 6:
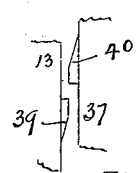
Figure 9:
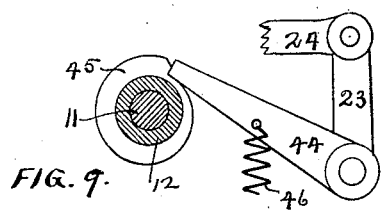
Figure 8:
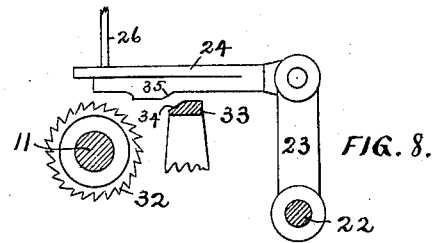
Figure 10:
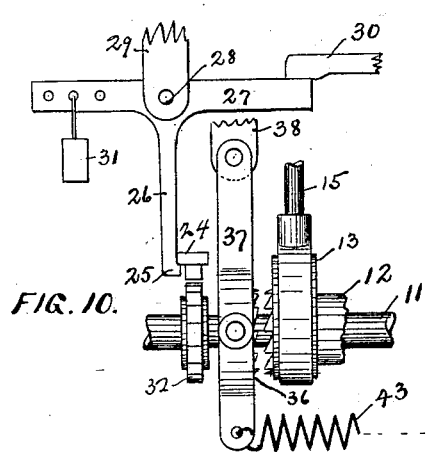
Figure 7:
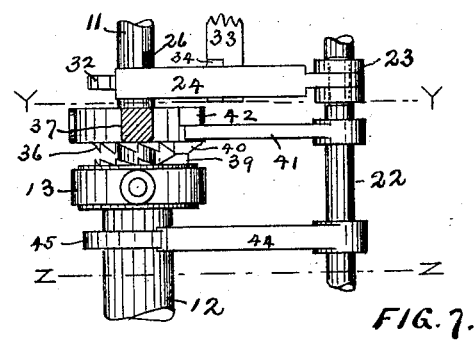
Figure 2:
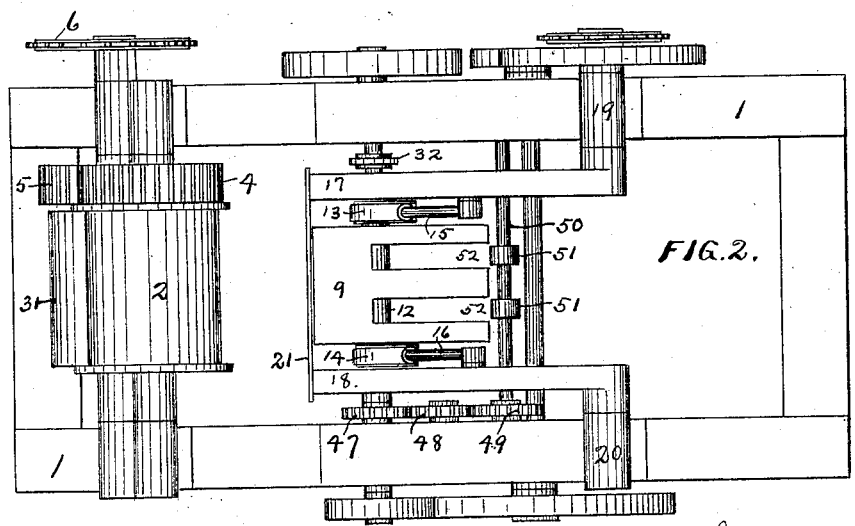

In the accompanying drawings we have shown our invention as applied to a dough-weighing machine for use in a bakery, and in said drawings Figure 1 is a longitudinal section of such machine with certain unessential details omitted so as to permit of a clearer understanding of the operating mechanism. Fig. 2 is a plan showing the relative position of said parts to the framework. Fig. 3 is a front elevation of the eccentric sleeve and clutch. Fig. 4 is a section on line X X of Fig. 3, looking to the right, showing the face of the movable clutch-half and the parts that coöperate therewith. Fig. 5 is a section on the same line, looking to the left. Fig. 6 is a diagram of the device for opening the clutch. Fig. 7 is a plan of the clutch end of Fig. 3 and the levers that coöperate therewith. Figs. 8 and 9 are sections on lines Y Y and Z Z, respectively, of Fig. 7; and Fig. 10 is a rear view of the mechanism adjacent to the clutch and the tripping device operated by the scale.

In the said drawings, 1 is a frame, on the upper rear portion of which are two feed-rollers 2 and 3, connected together by the gears 4 and 5 and driven by means of the sprocket-wheel 6. A feed-board 7 serves as a means for feeding dough to the rollers 2 and 3, from which it emerges in the form of a sheet upon the delivery-board 8, from whence it passes to the platen 9 on the scale-beam 10. Below the platen 9 and supported by the frame 1 is the main driving-shaft 11, on which is loosely mounted the sleeve 12 carrying the eccentrics 13 and 14, which latter are connected by the rods 15 and 16 to the arms 17 and 18 on pivoting-shafts in the boxes 19 and 20. On the ends of the arms 17 and 18 is a knife 21, adapted to cut off the dough between the delivery-board 8 and the scale-platen 9, when the arms 17 and 18 are brought downward by the action of the eccentrics 13 and 14. On a short shaft 22, carried by the frame 1, is secured an arm 23, to the upper end of which is pivoted a link 24, that is supported from falling by a catch 25, that forms the end of the arm 26 on the lever 27. The lever 27 is supported on a pivot 28 in the lug 29, that forms part of the frame 1 or may be secured thereto. One end of the lever 27 projects under a horn 30, that is carried by the scale-beam 10 under the platen 9, and the other end carries a weight 31 that serves to keep the first-mentioned end in contact with the horn 30, and also to keep the catch 25 under the link 24.

Secured to the shaft 11 and revolving therewith is a ratchet-wheel 32, that is directly under the end of the link 24. The action of the parts 24 to 32 is such that when an amount of dough has been fed onto the scale sufficient to cause it to descend, the lever 27 is tilted and the catch 25 is freed from the link 24, which then drops into the ratchet-wheel 32, and by the motion of the latter is forced toward the right, Fig. 8, thus giving a partial revolution to the shaft 22.

Located under the link 24 and supported in any convenient manner by the frame 1 is a bar 33 that has a beveled top 34 that coöperates with a correspondingly-beveled face 35 on the link 24. When the link 24 is forced forward by the action of the ratchet-wheel 32, these beveled faces serve to free it from the said ratchet and raise it high enough to be again engaged by the catch 25 when moved back into its original position.

Adjacent to the ratchet-wheel 32 and secured to the shaft 11 by a feather is a clutch 36 that is moved by the shifter 37 pivoted to the lug 38 on the frame 1. The other clutch-half is formed on the face of the eccentric 13, and when the two halves are in contact the sleeve 12 will rotate with the shaft 11. On the eccentric 13 and the shifter 37 are the beveled lugs 39 and 40, the office of which is to separate the clutch-halves when the sleeve 12 and eccentrics 13 and 14 have made a single revolution. The relative stopping places of these lugs 39 and 40 are shown in the diagram Fig. 6. On the shaft 22 is an arm 41, the end of which intercepts a lug 42 on the shifter 37 and serves to keep the clutch-halves separated when in the position shown in the drawings. A spring 43 serves to bring the halves together when the arm 41 is lifted by a partial revolution of the shaft 22 through the action of the ratchet-wheel 32 and link 24. Another arm 44, also on the shaft 22, serves to stop the eccentrics upon the completion of one revolution by coming into contact with the shouldered collar 45 on the sleeve 12. A spring 46 serves to move the shaft 22 and the levers secured thereto in a direction opposite to that in which they are forced by the ratchet-wheel 32. Loose on the shaft 11, but secured to the sleeve 12, is a gear 47, which, through the intermediate 48, acts upon the gear 49 to turn the shaft 50 one revolution every time that the sleeve 12 makes a revolution. Secured to the shaft 50 are two arms 51 that in making a revolution move through the slots 52 in the scale-platen 9. A removable scale-weight 53 serves to determine the weight at which the machine shall operate.

The operation is as follows: Dough is fed in at the rear between rollers 2 and 3 and is delivered downward over the board 8 onto the platen 9 in the form of a sheet of comparative thinness. When a quantity has been delivered sufficient to cause the scale to descend, the lever 27 is tilted and the catch 25 is released from the lever 24, which immediately falls into the ratchet-wheel 32 and is forced forward. This causes a partial revolution of the shaft 22 and a consequent lifting of the arms 41 and 44, thereby releasing the shifter 37 and the sleeve 12. The spring 43 brings the clutch together and causes a revolution of the eccentrics and consequently a descent of the knife 21 to sever the dough between the board 8 and scale-pan 9. Just before the completion of the full revolution the lug 39 comes into contact with lug 40 and forces the shifter 37 away to release the clutch and permit the arms 41 and 44 to drop into their holding position. The revolution of the sleeve 12 also causes a revolution of the shaft 50, the arms 51 on which come under the dough on the scale-pan, lifting it up and throwing it over onto the table 54 at the front of the machine. The lifting of the dough from the pan 9 permits the scale to rise and consequently the catch 25 to get under the link 24 before it moves back into its normal position away from the bar 33.

What we claim is—

1. In a weighing-machine, a scale-pan, devices for lifting material from the face of said pan, and connections between said pan and said lifting devices for causing the latter to operate immediately upon the descent of the former.

2. A scale, a releasing device operated by said scale, a power device adapted to operate upon the part so released, a second releasing device operated by the power connected by the first-mentioned releasing device, a clutch controlled by said second releasing device, and mechanism operated by said clutch for severing weighed material and removing the same from the scale.

3. In a machine for the continuous weighing of material fed upon a scale by rollers, a knife for severing weighed material, arms for removing the severed material from the scale, a releasing device operated by the scale, a second releasing device operated by power and controlled by the first-mentioned releasing device, and a power-operated device controlled by said second releasing device and adapted to actuate said knife and said arms.

4. A scale-pan and means for delivering material upon it, a knife for severing the material when a predetermined quantity has been deposited on the pan, devices for lifting the severed material from the face of said pan, and connections between said pan and said knife, and also between said pan and said lifting devices, for causing the knife and lifting devices to operate immediately upon the descent of the pan.

5. In a weighing-machine, a scale-pan, slotted openings in said pan, arms adapted to operate through said openings for lifting material from the face of said pan, and means for bringing said arms into operation by the descent of said pan.

6. In a machine provided with a scale-pan and a knife for severing material deposited on said pan, a continuously-revolving shaft, a sleeve mounted thereon and provided with eccentrics for operating said knife, a clutch for revolving said sleeve, a spring for causing the engagement of the clutch-halves, an intercepting device for holding said clutch in a disengaged position, and means for controlling the release of the intercepting device by the descent of the scale-pan.

7. A scale-pan and a knife for severing material deposited thereon, a sleeve provided with eccentrics for operating said knife, a clutch for revolving said sleeve, devices for engaging and disengaging said clutch, a stop for holding said sleeve when disengaged from said clutch, and means for controlling the release of said stop and the engagement of said clutch by the descent of said scale-pan.

8. A scale-pan, a knife for severing material deposited on said pan, eccentrics for operating said knife, a clutch for revolving said eccentrics, devices for holding said clutch out of operation and said eccentrics from revolution, and means for controlling the release of said clutch and said eccentrics by the descent of said scale-pan.

MAX SCHOLZ.
DANIEL J. O'CONNOR.
ROBERT J. BREMNER.

Witnesses:
B. A. MAHONY,
L. W. MAHONY.